United States Patent [19]
Koike et al.

[11] Patent Number: 5,924,399
[45] Date of Patent: Jul. 20, 1999

[54] INTAKE SYSTEM-DRAINING STRUCTURE FOR ENGINE

[75] Inventors: Yasuhiro Koike; Hiroshi Saitoh; Yuji Yoshikawa; Junichi Hoshino, all of Shizuoka-ken, Japan

[73] Assignee: Suzuki Motor Corporation, Hamamatsu, Japan

[21] Appl. No.: 08/997,862

[22] Filed: Dec. 24, 1997

[30] Foreign Application Priority Data

Dec. 27, 1996 [JP] Japan ..................................... 8-357795

[51] Int. Cl.$^6$ .................................................. F02M 35/00
[52] U.S. Cl. .................................. 123/184.21; 123/198 E
[58] Field of Search ........................ 123/184.24, 184.25, 123/184.26, 184.34, 184.35, 184.36, 184.42, 184.43, 184.44, 184.47, 184.48, 184.49, 198 E

[56] References Cited

U.S. PATENT DOCUMENTS 4,183,332  1/1980  Hofbaüer et al. .................. 123/184.42
5,048,469  9/1991  Spray ................................. 123/184.42
5,664,533  9/1997  Nakayama et al. ................ 123/184.42
5,826,553  10/1998  Nakayama et al. ................ 123/184.42

*Primary Examiner*—Henry C. Yuen
*Assistant Examiner*—Hai Huynh
*Attorney, Agent, or Firm*—Flynn, Thiel, Boutell & Tanis, P.C.

[57] ABSTRACT

An intake system-draining structure for an engine to remove water or other liquids that may collect on the surface of an intake manifold. The intake system-draining structure has several plate-like members that are disposed between branch pipes of an intake manifold positioned in the dust chamber of an air cleaner. A pair of communication members connects the branch pipes with the dust chamber. A water drain hole portion is formed through one of the plate-like members. The plate-like member with the water drain hole portion is positioned lower than the other plate-like members to efficiently drain water.

8 Claims, 6 Drawing Sheets

INTAKE SYSTEM-DRAINING STRUCTURE FOR ENGINE

FIELD OF THE INVENTION

This invention relates to an intake system-draining structure for an engine. More particularly, this invention relates to an intake system-draining structure for an engine having an air cleaner formed by lower and upper cases, in which the lower case is integrally formed with an intake manifold and the upper case is attached to the top of the lower case. The air cleaner is provided with an intake system-draining means, whereby it is possible to easily set up a water drain hole portion, to efficiently drain off water, with a consequential reduction in cost.

BACKGROUND OF THE INVENTION

In a multi-cylinder engine, an intake manifold is attached to a cylinder head of the engine. In addition, there is one type of engine having the intake manifold and an air cleaner integrally formed as an unitary structure. In this latter arrangement, as illustrated in FIG. 11, an intake manifold 102 and a lower case 106 of an air cleaner 104 are formed integrally as one piece. An upper case 108 is fitted onto the top of the lower case 106, thereby forming the air cleaner. A cleaner element (i.e., a filter) 110 is disposed between the cases 106 and 108 for partitioning the air cleaner 104 into a dust chamber 112 and a clean chamber 114. The dust chamber 112 is formed on the side of the lower case 106, while the clean chamber 114 is defined on the side of the upper case 108. A first plate-like member 118-1 projects up to an intermediate height and extends between first and second branch pipes 116-1 and 116-2 of the intake manifold 102 positioned in the dust chamber 112. A second plate-like member 118-2 also projects up to an intermediate height position and extends between the third and fourth branch pipes 116-3 and 116-4 of the intake manifold. A third plate-like member 118-3 projects up to an intermediate height position and extends between the second and third branch pipes 116-2 and 116-3.

In the above-described conventional engine intake system-draining structures, saddles or valleys, like passes in a mountain range, are formed between the adjacent branch pipes of the intake manifold. The saddles form part of the bottom of the air cleaner. As a result, the bottom of the air cleaner is dramatically serrated or sinusoidal in shape, thereby producing the saddles or valleys between the branch pipes of the intake manifold. This causes an inconvenience in that it is difficult to establish a drain hole in order to permit resident water in the saddles to be efficiently removed.

Further, when a plurality of water drain holes are defined at the bottom of the air cleaner so as to correspond with the serrated configurations of the bottom, this results in a complicated structure which is difficult to manufacture and is expensive. This is disadvantageous from an economical viewpoint.

SUMMARY OF THE INVENTION

To obviate the above-mentioned inconveniences, the present invention, in one variation thereof, provides an intake system-draining structure for an engine having an air cleaner provided on the top of an intake manifold attached to a cylinder head of a four-cylinder engine. The air cleaner is formed by lower and upper cases in which the lower case is formed integrally with the intake manifold, while the upper case is fitted to the top of the lower case. A cleaner element is provided between the lower and upper cases for partitioning the air cleaner into a dust chamber and a clean chamber, in which the dust chamber and the clean chamber are formed in the air cleaner on the sides of the lower case and upper case, respectively. An intake system-draining means is formed by: a first plate-like member disposed between the first and second branch pipes of the intake manifold positioned in the dust chamber; a second plate-like member disposed between the third and fourth branch pipes of the manifold; a third plate-like member positioned between the second and third branch pipes; a first communication member for connecting the first branch pipe with the dust chamber wall; a second communication member for connecting the fourth branch pipe with the dust chamber wall; and, a water drain hole portion in which, when the first, second, and third plate-like members as well as the first and second communication members are formed so as to lie at the top portions of the first to fourth branch pipes, then one of these members is formed at a position lower than the remainder, and the drain hole portion is defined through such lowered member.

The present invention, in another variation thereof, provides an intake system-draining structure for an engine having an air cleaner provided on the top of an intake manifold attached to a cylinder head of a four-cylinder engine. The air cleaner is formed by lower and upper cases, in which the lower case is formed integrally with the intake manifold, while the upper case is fitted to the top of the lower case. A cleaner element is provided between the lower case and the upper case for dividing the air cleaner into a dust chamber and a clean chamber. The dust chamber and the clean chamber are formed in the air cleaner on the sides of the lower case and the upper case, respectively. An intake system-draining means is formed by a communication space section and a water drain hole portion. The communication space section is defined by at least part of a bottom portion of the lower case being formed at a position lower than an attachment-side end portion of the intake manifold in order to communicate with the inside of the dust chamber at the underside of branch pipes of the intake manifold, the attachment-side end portion being the location where the intake manifold is attached to the cylinder head of the engine. The water drain hole portion is formed at the lowest position of the communication space section.

Pursuant to the present invention as described above, the intake system-draining structure, formed by the first to third plate-like members, the first and second communication members, and the drain hole portion, facilitates set-up of the water drain hole portion and provides efficient drainage of water, and a consequential reduction in cost.

In addition, the intake system-draining means formed by the communication space section and the water drain hole portion provides easier forming of the drain hole portion, efficient drainage of water, and reduced cost.

DETAILED DESCRIPTION

The present invention will now be described with reference to FIGS. 1–6 which illustrate a first embodiment.

Figure 2:
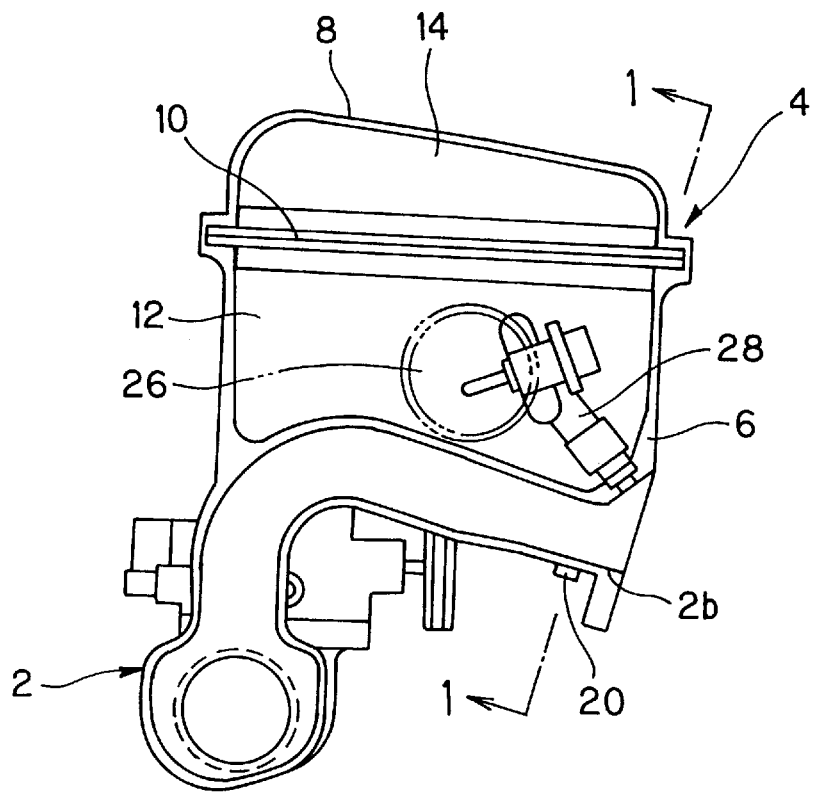
FIG. 2 is a sectional view taken along line 2—2 of FIG. 3.
Figure 3:
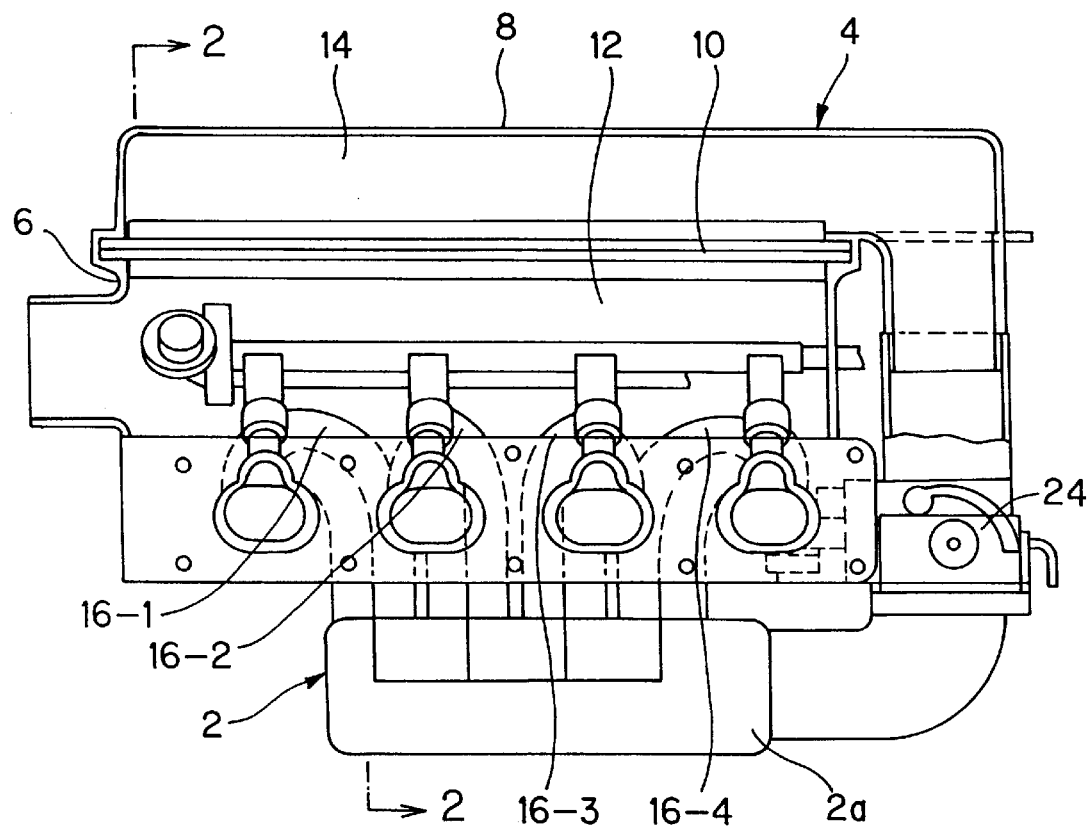
FIG. 3 is a front view showing an intake manifold and an air cleaner.
Figure 4:
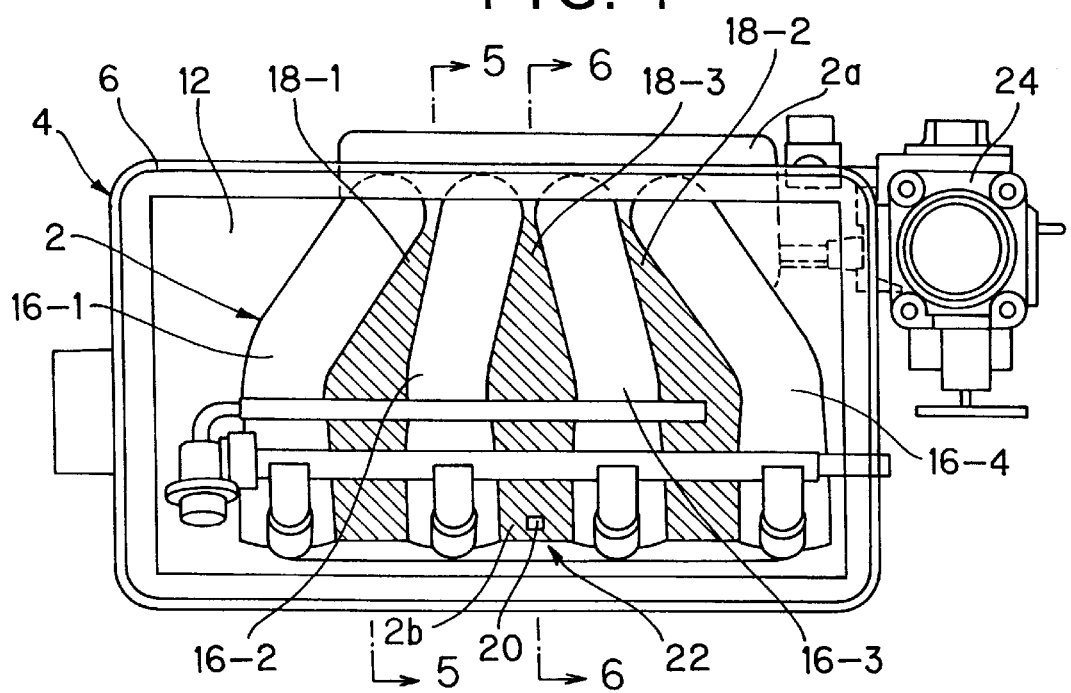
FIG. 4 is a plan view of FIG. 3 but with an upper case of the air cleaner being removed.

In FIGS. 2 to 4, reference numeral 2 denotes an intake manifold and 4 an air cleaner. The intake manifold 2 is fitted to a cylinder head (not shown) of a four-cylinder engine (not shown) on the intake side thereof.

The intake manifold 2 is formed integrally with the air cleaner 4. More specifically, the intake manifold 2 and a lower case 6 of the air cleaner 4 are formed integrally as one piece. Then, an upper case 8 is attached onto the top of the lower case 6, thereby forming the air cleaner 4. A cleaner element (i.e. a filter) 10 is disposed between the lower case 6 and the upper case 8, thereby partitioning the air cleaner 4 into a dust chamber 12 and a clean chamber 14. The dust chamber 12 is formed on the side of the lower case 6, while the clean chamber 14 is defined on the side of the upper case 8.

An intake system-draining structure 22 is formed by: a first plate-like member or wall 18-1 connected between the first and second branch pipes 16-1 and 16-2 of the intake manifold 2 positioned in the dust chamber 12; a second plate-like member or wall 18-2 connected between the third and fourth branch pipes 16-3 and 16-4 of the manifold 2; a third plate-like member or wall 18-3 connected between the second and third branch pipes 16-2 and 16-3; a first communication member or wall 30-1 for connecting the first branch pipe 16-1 with the dust chamber 12; a second communication member or wall 30-2 for connecting the fourth branch pipe 16-4 with the dust chamber 12; and, a drain hole portion 20 in which, when the preceding members or walls 18-1, 18-2, and 18-3 as well as 30-1 and 30-2 are formed so as to lie at or adjacent the top portions of the branch pipes 16-1 to 16-4, then one of these members, e.g., the third plate-like member or wall 18-3 in this embodiment, is formed at a lower position than the remainder of the walls. This lowered third member 18-3 has the drain hole portion 20 defined therethrough.

Figure 5:
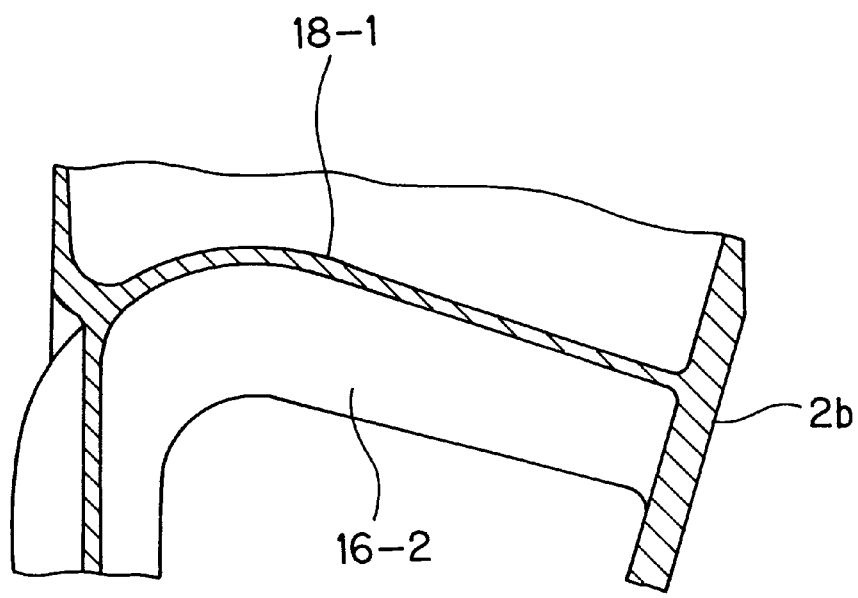
FIG. 5 is an enlarged sectional view taken along line 5—5 of FIG. 4.

In greater detail, in the intake system-draining structure 22, when the plate-like members 18-1, 18-2, and 18-3, the communication members 30-1 and 30-2, and the drain hole portion 20 are formed, then the first and second plate-like members 18-1, 18-2 are formed so as to conform with the longitudinal of the configuration respective branch pipes of the intake manifold, as illustrated by the wall 18-1 and pipe 16-2 in FIG. 5. In addition, the third plate-like member 18-3 has the drain hole portion 20 formed adjacent to an end portion 2b (FIGS. 4 and 6) of the intake manifold 2 on the downstream side thereof (i.e., the downstream end of the branch pipes). The end portion 2b is an attachment-side end portion at which the intake manifold 2 is fitted to the cylinder head of the engine. Further, the third plate-like member 18-3 is disposed so as to be progressively lower in height position (FIG. 6), while being sloped downwardly in a direction toward the drain hole portion 20.

Figure 6:
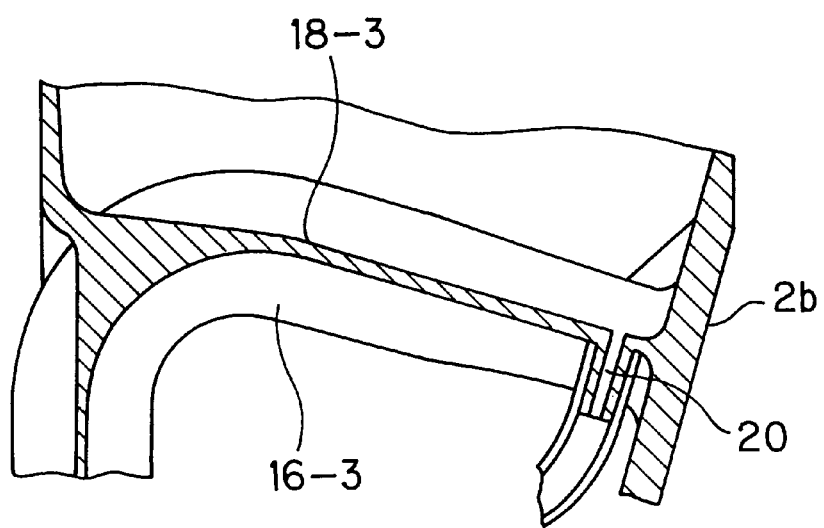
FIG. 6 is an enlarged sectional view taken along line 6—6 of FIG. 4.

More specifically, the first and second plate-like members 18-1, 18-2 are formed so as to match the first to fourth branch pipes 16-1 to 16-4 in curvilinear configuration along the length of the branch pipes, as shown in FIG. 6. The first and second plate-like members 18-1, 18-2 are also formed so as to be joined with the top portions of the first and second branch pipes 16-1, 16-2 and the top portions of the third and fourth branch pipes 16-3, 16-4, respectively.

Referring to FIG. 5, one side of the first plate-like member or wall 18-1 (the left side in FIG. 5) is shown raised progressively in height toward an intermediate section, and is formed to slope downwardly from the intermediate section to the one side (the left side in FIG. 5). In addition, the first and second branch pipes 16-1, 16-2 are similarly configured.

With continued reference to FIG. 5, the other side of the first plate-like member 18-1 (the right side in FIG. 5) is shown lowered gradually in height position (i.e., sloped downwardly) from the intermediate section so that the other side (i.e., side 2a) is at a lower elevation than the intermediate section.

Figure 1:
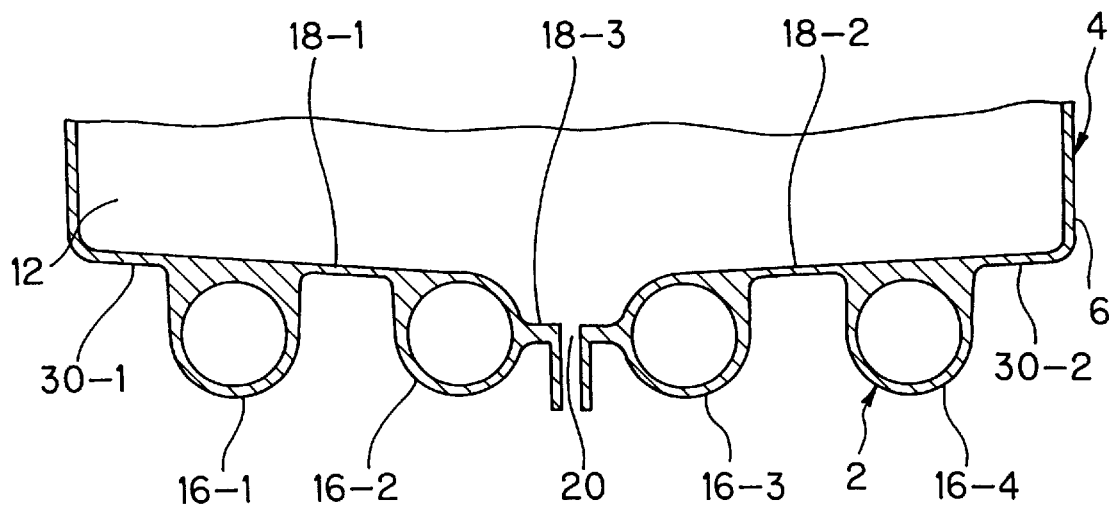
FIG. 1 is an enlarged end view taken along line 1—1 of FIG. 2 and illustrating an intake system-draining structure for an engine according to a first embodiment of the present invention.

The first member or wall 18-1 is also progressively lowered in height position (i.e. sloped downwardly) as it extends toward the third member 18-3. More specifically, as illustrated in FIG. 1, the first plate-like member or wall 18-1 is progressively lowered in height as the wall projects transversely toward the third plate-like member 18-3 as positioned between the second and third branch pipes 16-2, 16-3. This structure reliably provides a smooth downward flow of water.

The description of the second plate-like member 18-2 is omitted because the first and second plate-like members 18-1 and 18-2 are of identical construction except for being symmetrically positioned on opposite sides of the wall 18-3.

As illustrated in FIGS. 1 and 2, the water drain hole portion 20 is provided through the third plate-like member 18-3 adjacent to the end portion 2b of the intake manifold 2 on the downstream side thereof. In addition, a guide hose, as indicated in FIG. 6, is connected to the hole portion 20.

Referring now to FIG. 6, the third plate-like member 18-3 is illustrated formed so as to be gradually lowered in height (i.e., sloped downwardly) as it extends from one side of the third plate-like member 18-3 (the left side in FIG. 6) to the other side thereof (the right side in FIG. 6) where the drain hole portion 20 is formed. This construction provides a smooth downward flow of water.

As shown in FIG. 1, the third plate-like member 18-3 is provided at a lower position than the first and second plate-like members 18-1 and 18-2, and is also lower than intermediate height positions of the second and third branch pipes 16-2, 16-3. As a result, the function of collecting water into the hole portion 20 is ensured.

As illustrated in FIG. 1, the first communication member or wall 30-1 is provided in order to connect the top portion of the first branch pipe 16-1 with the sidewall of the dust chamber 12. The second communication member 30-2 is disposed in order to connect the top portion of the fourth branch pipe 16-4 with the sidewall of the dust chamber 12.

The walls 30-1 and 30-2 also slope downwardly toward the channel-like trough defined above the wall 18-3, with the walls 30-1 and 30-2 substantially being aligned extensions of the respective walls 18-1 and 18-2 in the transverse direction.

Referring to FIGS. 2, 3 and 4, reference numeral 24 denotes a throttle body attached to end portion 2a of the intake manifold 2 on the upstream side thereof. An air inlet 26 of the air cleaner 4, and a fuel injection valve 28 are disposed in the lower case 6 of the air cleaner 4.

The operation of the embodiment of FIGS. 1–6 will now be briefly described.

Water and/or oil admitted into the air cleaner 4 are collected in the dust chamber 12. The water/oil on the first and second plate-like members 18-1 and 18-2 adjacent the left side thereof in FIG. 5 are caused to flow transversely toward the third plate-like member 18-3 by the transverse slope of the first and second members 18-2 and 18-2. Then, the slant of the third member 18-3 causes the water/oil to flow from said one side of the same member 18-3 (the left side in FIG. 6) to the other side thereof (the right side in FIG. 6) wherein the drain hole portion 20 is formed. Also, the water/oil on the other side of the first and second plate-like members 18-1 and 18-2 (the right side in FIG. 5) flows transversely toward the lower end of the third plate-like member 18-3 (the right side in FIG. 6) due to the transverse slope of the first and second members 18-1 and 18-2.

Consequently, the bottom of the air cleaner 4 does not form a sinusoidal-like configuration as a result of: the first to third plate-like members 18-1 to 18-3 connecting with the first to fourth branch pipes 16-1 to 16-4; and, the first and second communication members 30-1, 30-2 connecting the first and fourth branch pipes 16-1 and 16-4 respectively with the sidewall of the dust chamber 12. Accordingly, no saddles or valleys are formed between the first and second branch pipes 16-1 and 16-2, or between the third and fourth branch pipes 16-3 and 16-4. As a result, the water gathers in the channel above the third plate-like member 18-3 for easy removal forming through the drain hole portion 20.

In addition, the bottom of the air cleaner 4 does not form a sinusoidal-like pattern as a result of: the first and second plate-like members 18-1, 18-2 connecting with the top portions of the first and second branch pipes 16-1 and 16-2 and the top portions of the third and fourth branch pipes 16-3 and 16-4; and, the first and second communication member 30-1, 30-2 connecting the first and second branch pipes 16-1, 16-4 respectively with the dust chamber 12. Accordingly, no saddles or valleys are formed between the first and second pipes 16-1 and 16-2 or between the third and fourth pipes 16-3 and 16-4. As a result, the water gathers at the other side of the third plate-like member 18-3 (the right side in FIG. 6). The above construction facilitates forming of the drain hole portion 20, and enables efficient draining of water.

Since the air cleaner 4 does not have the bottom defined with large serrations, a plurality of water drain holes does not need to be formed at the bottom of the air cleaner 4. This provides a simplified construction which is easy to manufacture at reduced cost.

With the construction described above, and as shown in FIGS. 1, 5 and 6, the walls 18-1, 18-2, 18-3, 30-1 and 3-2 effectively define the bottom wall of the lower air cleaner case 6. Further, the walls 18-1 and 30-1, effectively define a generally flat wall portion on one side of the wall 18-3, and similarly the walls 18-2 and 30-2 also define a generally flat wall portion on the other side of the wall 18-3. These wall portions as defined on opposite sides of the wall 18-3 are each preferably slightly sloped downwardly toward the channel-like space defined above the wall 18-3 to facilitate collection of liquid therein.

Figure 7:
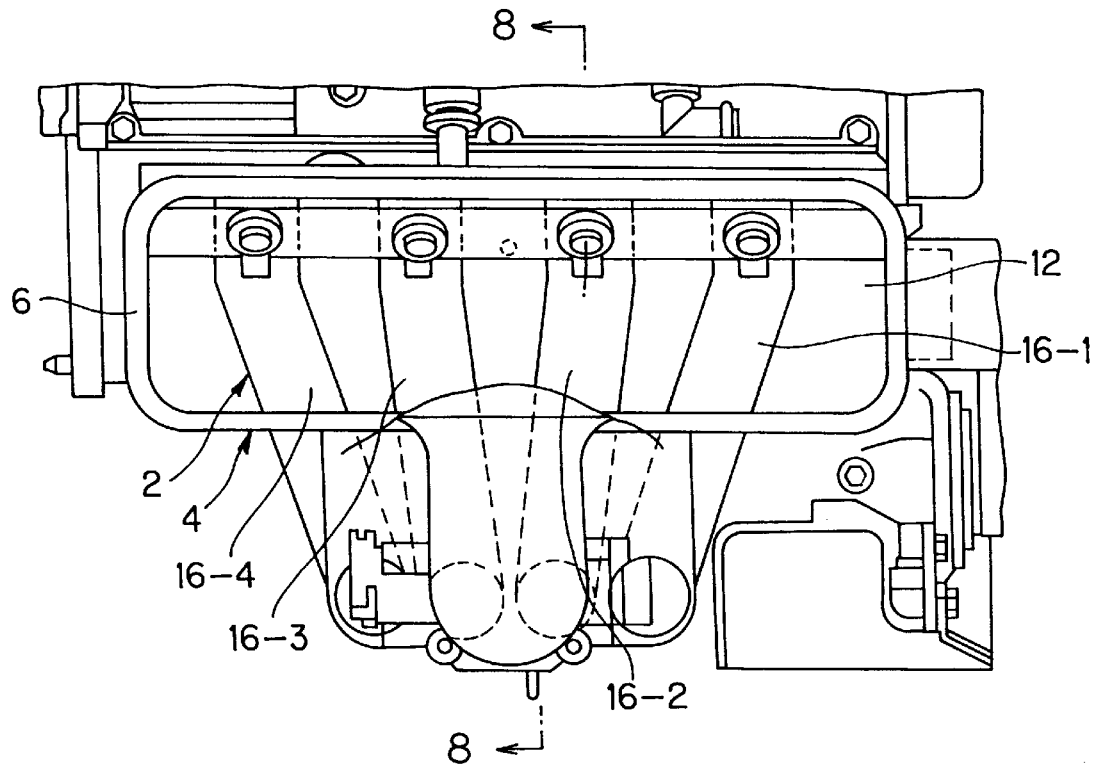
FIG. 7 is a plan view illustrating an intake manifold and an air cleaner according to a second embodiment of the invention.
Figure 8:
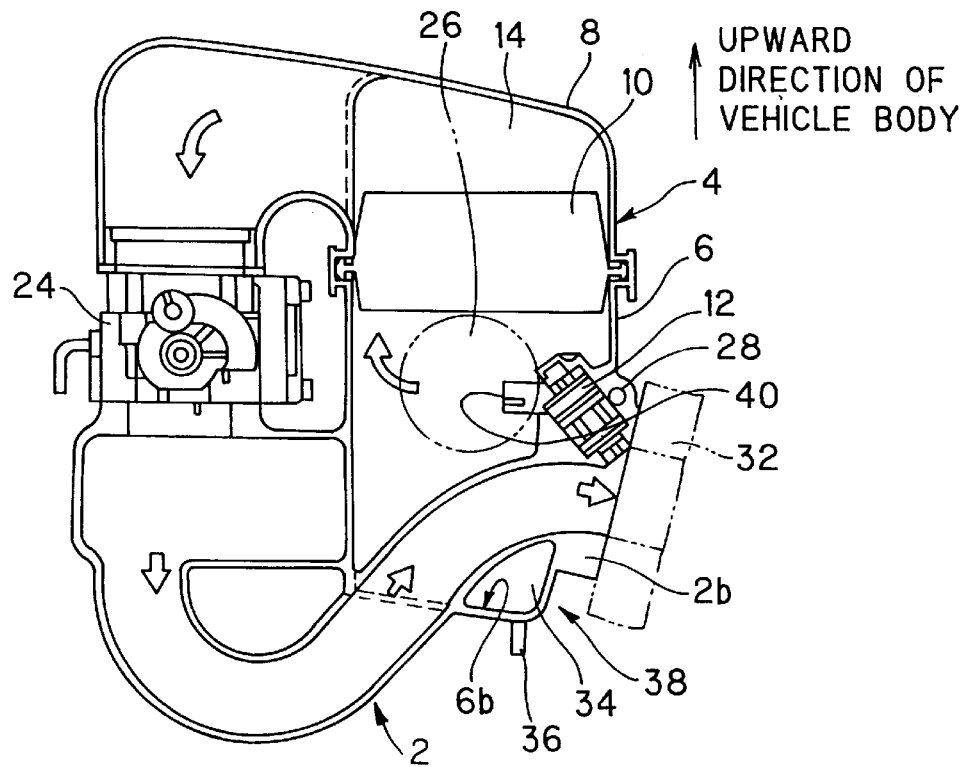
FIG. 8 is a sectional view taken along line 8—8 of FIG. 7.

Referring now to FIGS. 7 and 8, there is illustrated a second embodiment of the invention. In this embodiment the same reference numerals are used to identify these features which are substantially identical in function to those described above with reference to FIGS. 1–6.

The embodiment of FIGS. 7–8 is characterized in that at least part of a bottom portion 6b of the lower case 6 of the air cleaner 4 is formed at a position lower than an end portion 2b of the intake manifold 2 on the downstream side thereof. The end portion 2b is an attachment-side end portion of the intake manifold 2, at which the intake manifold 2 is fitted to a cylinder head 32 of an engine.

More specifically, as illustrated in FIG. 8, a cleaner element 10 is provided in the air cleaner 4 between the lower case 6 and an upper case 8 for dividing the air cleaner 4 into a dust chamber 12 and a clean chamber 14. In the air cleaner 4, the dust chamber 12 is formed on the side of the lower case 6, while the clean chamber 14 is defined on the side of the upper case 8. In order to communicate with the inside of the dust chamber 12 at the underside of branch pipes of the intake manifold 2 (i.e. first to fourth branch pipes 16-1 to 16-4), then at least part of the bottom portion 6b of the lower case 6 is formed at a position lower than the aforesaid end portion 2b of the intake manifold. This bottom portion 6b forms therein a communication space or chamber 34 which is below and communicates with the underside of the branch pipes. A water drain hole portion 36 is formed at the lowest position of the communication space or chamber 34. The communication space 34 and the drain hole portion 36 form an intake system-draining structure 38.

With continued reference to FIG. 8, the space 34 is shown formed so as to have a size corresponding to one-half to one-third width of the bottom portion 6b (the right and left directions in FIG. 8). The space 34 has the drain hole portion 36 defined at the lowest portions thereof, i.e., at a location toward the above-described end portion 2b.

Reference numeral 40 denotes a fuel-delivering pipe.

As a result of the above construction, the lower case 6 of the air cleaner 4 has the bottom portion 6b free of a serrated configuration. In addition, the communication space section 34 collects water at the drain hole portion 36 that is defined at the lowest position of the space section 34. Similarly to the embodiment of FIGS. 1–6, this feature provides easy forming of the drain hole portion 36, and enables efficient drainage of water. Since the bottom portion 6b is substantially flattened, a plurality of water drain holes are not required.

It is to be noted that the present invention is not limited to the above-described embodiments, but can have various changes and modifications.

For example, the first and second plate-like members or walls 18-1 and 18-2 may be formed in parallel to one another, although the first and second plate-like members according to the first embodiment are progressively lowered in height position toward the third plate-like member 18-3 which is positioned between the second and third branch pipes.

In addition, although the drain hole portion according to the first embodiment is provided through the third plate-like member adjacent to the end portion of the intake manifold on the downstream side thereof, a change in design can be made in case of interference with other components such as a mounting bolt. For example, the drain hole portion can be formed at a position either offset or slanted therefrom, and then a union can be provided.

In the first embodiment, a guide hose is simply connected to the water drain hole portion; however, a longer guide hose may be incorporated, which hose is resistant to inducting water or snow in order to avoid admitting such water or snow into the air cleaner through the drain hole portion. Alternatively, a check valve may be provided substantially midway along the guide hose. It is optional to connect the guide hose to the drain hole portion.

Pursuant to the first embodiment of FIGS. 1–6, the first and second plate-like members 18-1 and 18-2 are formed so as to correspond in curvilinear configuration with the first to fourth branch pipes 16-1 to 16-4 of the intake manifold 2. The first plate-like member 18-1 is formed so as to connect with the top portions of the first and second branch pipes 16-1, 16-2, while the second plate-like member 18-2 is formed so as to connect with the top portions of the third and fourth branch pipes 16-3, 16-4. The third plate-like member 18-3 is formed between the second and third branch pipes 16-2 and 16-3 at a position lower than the first and second plate-like members 18-1, 18-2. The third plate-like member 18-3 has the water drain hole portion 20 defined therethrough.

Figure 9:
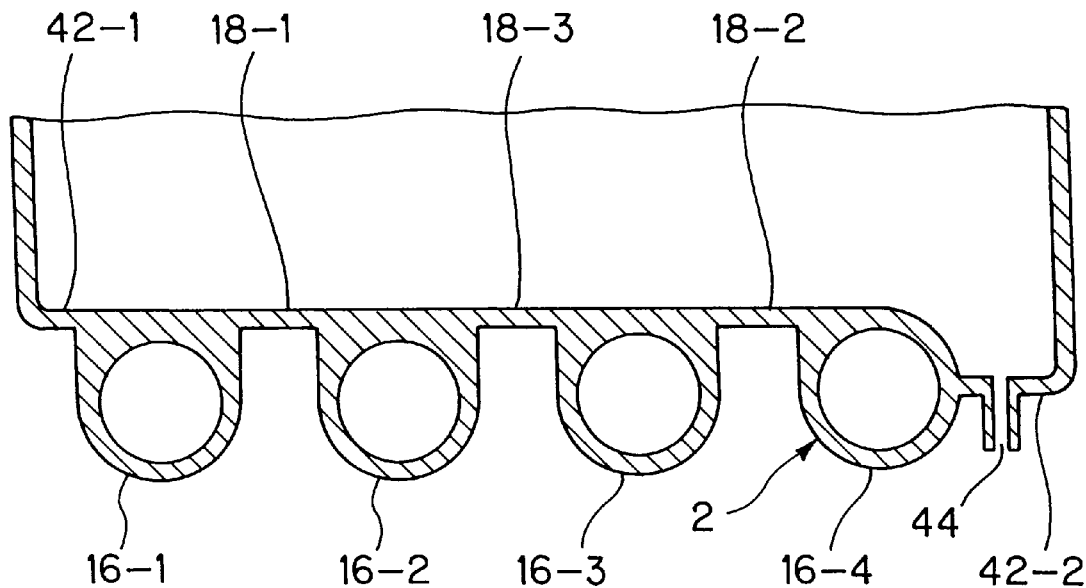
FIG. 9 is an enlarged end view similar to FIG. 1 but illustrating an intake manifold and an air cleaner according to another embodiment of the invention.

Now, referring to FIG. 9, when the first to third plate-like members or walls 18-1 to 18-3 are formed on the first to fourth branch pipes 16-1 to 16-4, and further when the first and second communication members or walls 42-1 and 42-2 are formed, then only the second communication member 42-2 may be formed at a position lower than the rest of the aforesaid members or walls. The other members or walls 18-2, 18-2, 18-3 and 42-1 define a generally flat and continuous wall or floor section which readily permits water to flow into the channel or space defined above the wall 42-2. A water drain hole portion 44 is defined through the second communication member 42-2.

Figure 10:
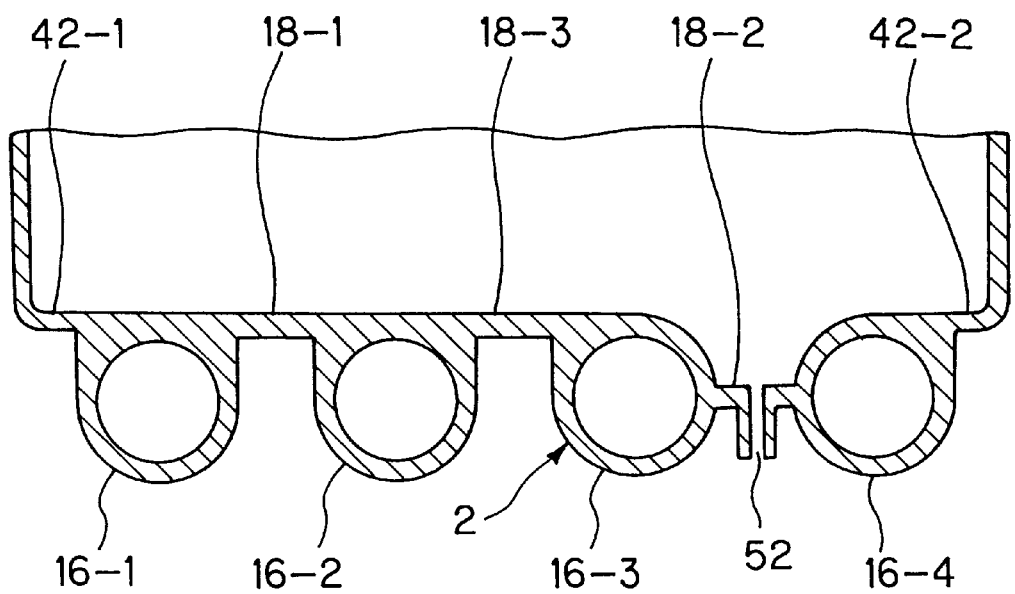
FIG. 10 is an enlarged end view similar to FIG. 1 but illustrating an intake manifold and an air cleaner according to still another embodiment of the invention.
Figure 11:
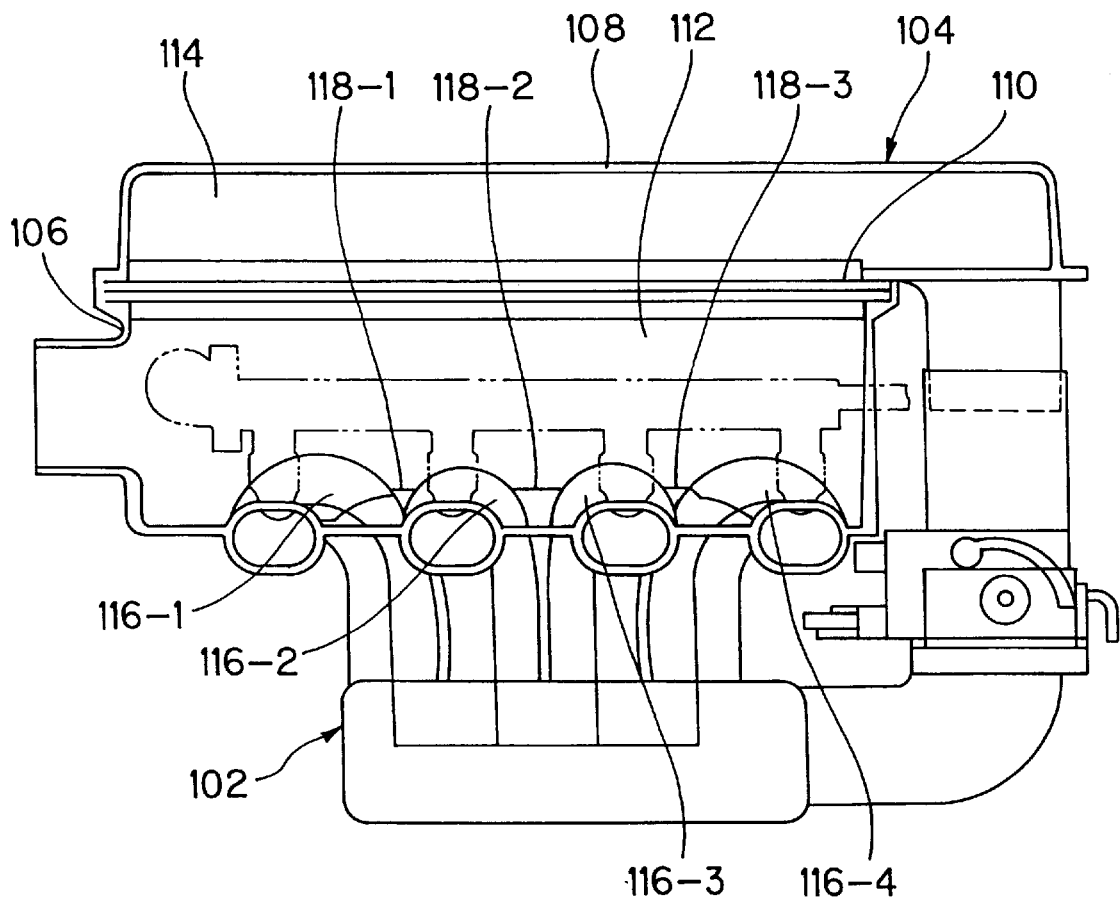
FIG. 11 is a front view showing an intake manifold and an air cleaner according to the prior art.

Alternatively, as shown in FIG. 10, when the first to third plate-like members or walls 18-1 to 18-3 as well as the first and second communication members or walls 42-1 and 42-2 are formed, then only the second plate-like member 18-2 may be defined at a position lower than the remainder. A water drain hole portion 52 is formed through the second plate-like member 18-2. The walls 18-1, 18-3 and 42-1 define a flat and generally continuous wall or floor section from which the water can readily flow into the region above the wall 18-2.

In embodiments of FIGS. 9 and 10, sloping of the plate-like members and communication members is not necessarily required, but these members may be sloped or slanted as a result of the orientation of the structure when attached to the engine.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In an intake system-draining structure for an engine having an air cleaner provided on top of an intake manifold attached to a cylinder head of a four-cylinder engine, said air cleaner being formed by lower and upper cases in which said lowered case is formed integrally with said intake manifold, said upper case is fitted to the top of said lower case, the improvement comprising: a cleaner element is provided in said air cleaner between said lower case and said upper case for dividing said air cleaner into a dust chamber and a clean chamber which are respectively formed in said air cleaner on the sides of said lower case and said upper case, and said intake manifold has a plurality of intake pipes in said dust chamber, comprising the improvement wherein the intake system-draining structure is formed by a communication space section and a water drain hole portion, said communication space section being formed at least in part by a bottom portion of said lower case being located at a position lower than an attachment-side end portion of said intake manifold in order to communicate with the inside of said dust chamber at an underside of the branch pipes of said intake manifold, said attachment-side end portion being located where said intake manifold is attached to the cylinder head of the engine, and said water drain hole portion being formed at the lowest position of said communication space section.

2. In an intake system-draining structure for an internal combustion engine having an air cleaner provided on top of an intake manifold attached to a cylinder head of a four-cylinder engine, said air cleaner being formed by lower and upper cases, in which said lower case is formed integrally with said intake manifold, said upper case is fitted to the top of the said lower case, a cleaner element is provided between said upper and lower cases for partitioning said air cleaner into a dust chamber and a clean chamber which are respectively formed in said air cleaner on the sides of said lower case and said upper case, and said intake manifold has a plurality of branch pipes joined to the lower case, comprising the improvement wherein said intake system-draining structure includes: said lower case including a bottom wall which is integrally joined to said plurality of branch pipes with said branch pipes extending generally transversely of said bottom wall in sidewardly spaced relation therealong, said bottom wall including a first wall portion which extends sidewardly between and is fixedly joined to first and second said branch pipes which are disposed sidewardly adjacent one another, said first wall portion being disposed downwardly from tops of said first and second branch pipes for defining a water collecting channel therebetween, said bottom wall including a second wall portion which extends from the top of said first branch pipe to one sidewall of said lower case, said bottom wall including a third wall portion which extends from the top of said second branch pipe to an opposite sidewall of said lower case, said second and third wall portions being substantially at an elevation corresponding to the tops of said branch pipes so that water collecting on said second and third wall portions flow into the channel defined above said first wall portion, and a drain opening formed downwardly through said first wall portion for draining water from said channel.

3. An intake system-draining structure according to claim 2, wherein said first and second branch pipes are disposed between third and fourth said branch pipes.

4. An intake system-draining structure according to claim 2, wherein third and fourth said branch pipes are positioned on one side of said second branch pipe which is opposite from the side on which said first branch pipe is positioned.

5. An intake system-draining structure according to claim 2, wherein each of said first and second wall portions, as they extend transversely relative to elongated directions of said branch pipes, are gently sloped downwardly toward said channel.

6. An intake system-draining structure according to claim 2, wherein said first wall portion is gently sloped downwardly as it extends from one end to an other end thereof, and wherein said drain opening is formed through said first wall portion adjacent said other end thereof.

7. In an intake system-draining structure for an internal combustion engine having an air cleaner provided on top of an intake manifold attached to a cylinder head of a four-cylinder engine, said air cleaner being formed by lower and upper cases, in which said lower case is formed integrally with said intake manifold, said upper case is fitted to the top of the said lower case, a cleaner element is provided between said upper and lower cases for partitioning said air cleaner into a dust chamber and a clean chamber which are respectively formed in said air cleaner on the sides of said lower case and said upper case, and said intake manifold has a plurality of branch pipes joined to the lower case, comprising the improvement wherein said intake system-draining structure includes: said lower case including a bottom wall which is integrally joined to said plurality of branch pipes with said branch pipes extending generally transversely of said bottom wall in sidewardly spaced relation therealong, said bottom wall including a main wall portion which is generally coextensive with and extends between tops of first through fourth said branch pipes with said first wall portion extending beyond said fourth branch pipe for connection to an adjacent sidewall of said lower case, said bottom wall also including a secondary wall portion which extends between said first branch pipe and an adjacent sidewall of said lower case, said secondary wall portion being at an elevation below said main wall portion to define a channel-like space for collecting therein water which is deposited on said main wall portion, and a drain hole formed downwardly through said secondary wall portion for discharging water from said channel.

8. An intake system-draining structure according to claim 7, wherein said secondary wall portion is gently sloped downwardly as it extends from one end to an other end thereof, and wherein said drain opening is formed through said secondary wall portion adjacent said other end thereof.

* * * * *